Nov. 30, 1948.  F. H. LOBDELL  2,455,183
TOOL
Original Filed March 1, 1940
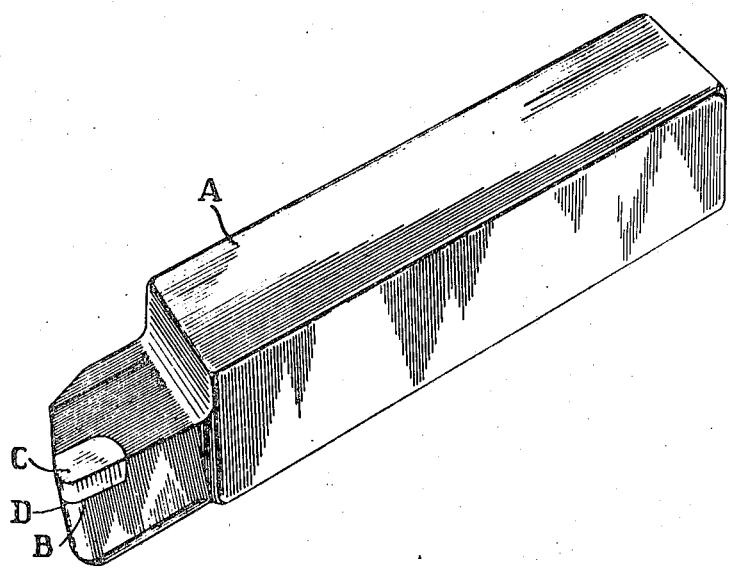
INVENTOR
Franklin H. Lobdell
BY
ATTORNEY Patented Nov. 30, 1948

2,455,183

UNITED STATES PATENT OFFICE 2,455,183

TOOL

Franklin Howard Lobdell, Naugatuck, Conn., assignor to The Bullard Company, a corporation of Connecticut Continuation of application Serial No. 321,743, March 1, 1940. This application May 10, 1944, Serial No. 534,951

7 Claims. (Cl. 29—95)

1

This invention relates to tools for machining metal, and particularly to tools that are employed in making relatively heavy cuts at substantially high cutting speeds. This application is a continuation of abandoned application Serial Number 321,743 filed March 1, 1940, in the name of Franklin Howard Lobdell.

Tools of this general classification usually comprise a shank portion adapted to be gripped by a tool head of a machine, and a tip portion for effecting the actual cutting. The shank portions of prior-known tools of this class are comprised of relatively inexpensive steel, while the tip portions usually comprise relatively expensive materials among which are various alloys such as high-speed tool steels, non-ferrous alloys of chromium and cobalt with small percentages of molybdenum and/or tungsten, cemented carbides, and other well-known materials. The above-referred to materials from which cutting tip portions are fabricated are of a hardness in excess of 60 Rockwell C and/or possess the characteristic of "red hardness." "Red hardness" is that property or characteristic of a metal-cutting material that renders it capable of retaining its hardness and cutting edge at high speeds or high temperatures. These cutting tips may be brazed or silver soldered to, or mechanically held in a seat formed in the forward end of the relatively inexpensive shank material. Certain of these cutting tip materials, such as the non-ferrous alloys of chromium and cobalt with small percentages of molybdenum and/or tungsten, and especially the cemented carbides, are extremely brittle and require careful handling by the operator. Aside from the breakage of these tips by inadvertence of the operator, great difficulty is experienced in their use during the machining of work because they frequently fracture and separate from the seat to which they are fixed. Many attempts have been made to solve this problem of tip breakage, but without success.

Additionally, steel shanks for tools to which tips are adapted to be attached are usually made from bar stock, requiring numerous machining and/or forging operations to shape the tool to the desired form, and thereby rendering the cost of manufacturing such tools relatively high.

An object of this invention is to provide a tool having a shank and a cutting tip which will

2 overcome the above and other difficulties of prior-known tools.

Other objects of the invention include providing a tool having a shank portion made of a substance that will support a tip of cutting material so that the latter will not rupture during use; the provision of a tool having a shank portion and a cutting tip portion, in which the shank portion is made of a material that will at least tend to absorb vibrations rather than to transmit them; the provision of a tool having a shank portion to which a cutting tip is adapted to be connected, said shank being made of a material having at least a substantial portion of its constituents present as a bonded mechanical mixture; the provision of a tool having a shank made of material containing uncombined carbon in substantial quantities and an attached cutting tip of a much harder material; the provision of a tool having a shank portion of any desired form and an attached tip, in which only a minimum amount of machining is required for fabrication; and the provision of a tool having a cast shank portion to which a cutting tip is attached.

The above, as well as other objects and novel features of the invention will become apparent from a consideration of the following specification and drawing, in which the single figure represents one embodiment of the invention.

The shank portions of prior-known tools that employ an attachable cutting tip are, without exception, made from various steels and their alloys, and many types of alloys have been used in an endeavor to limit the amount of tip breakage. The principal aim in selecting such alloys has been to provide a shank material of sufficient hardness to support the cutting tip in a manner to prevent its rupturing. While these endeavors have, to a certain extent, improved tools, they have not materially limited the amount of tip breakage.

The present invention comprises the employment of a shank or tip-supporting portion A made of a cast material having sufficient tensile strength to withstand the demands of a given job. By casting the shank, it is possible to produce complicated tool forms without involving any substantial amount of machining. The only machining necessary is to form a side and bottom at right angles and to mill out a seat B for a cutting tip C, as is well understood in the art.

Many types of cast material may be employed for the shank of the tool so long as they have adequate tensile strength for the operation to be performed. Extensive tests have been made on two materials that satisfy the requirements for normal machining operations. The compositions of these two materials are as follows:

|  | I | II |
|---|---|---|
| Carbon | 3.00-3.25 | 3.00-3.10 |
| Manganese | .70-1.00 | .70-1.00 |
| Silicon | 2.00-2.25 | 2.00-2.25 |
| Sulphur | .08 Max. | .08 Max |
| Phosphorus | .25 Max. | .25 Max. |
| Chromium | .40-.50 | .40-.70 |
| Nickel | .20-.30 | .20-.30 |
| Molybdenum |  | .60-.80 |

It is obvious that cast materials having compositions different than the two above noted may be employed for the shanks of the tools. The only apparent limitation is that the cast material be of sufficient tensile strength to meet the demands of the work to be done, and, therefore, it is desirable that the cast material be alloyed with one or more strength-imparting elements.

The material for the cutting tip C adapted to be connected to the shank A of the tool may be any one of a number of materials, including ordinary steel, as well as materials having a hardness in excess of 60 Rockwell C and/or possessing the characteristic of "red hardness" such as high-speed cutting tool steel, cemented carbides, non-ferrous alloys of chromium and cobalt with a small percentage of molybdenum and/or tungsten, as well as many others. The cutting tips are usually pre-formed, and the cutting end of the shank is machined to form a satisfactory seat B to which the cutting tip C is adapted to be fixed. Although the tips may be mechanically held in the seats, they are preferably brazed or silver-soldered in place by a layer of bonding material as distinguished from autogenous penetration of the tip material into the cast iron material of the tip support, by methods well known in the art.

The machining of the seat B and the preforming of the cutting tip C should be accurately done so that substantially perfectly mating surfaces are present between which the bonding material is located. The bonding material should be as thin as possible consistent with a proper bond. In order for the rigid cast material to properly support the brittle tip, this bonding layer should be substantially strain-resistant.

During a working operation, excessive heat is generated which tends to weaken the bond between the tip and the shank. This weakening tendency is noticeably minimized when a cast iron shank is employed due probably to the fact that cast iron transmits heat at a greater rate than steel.

A very important feature of this invention is the combination of a cast shank and a tip made of relatively brittle material, such as the non-ferrous alloys of chromium and cobalt with small percentages of molybdenum and/or tungsten, and particularly the cemented carbides. It has been found that shanks made of cast material support these tips so that substantially no tip breakage occurs during use, and in general are far superior to tools of steel shanks. It is not apparent just how the cast shank eliminates the tip fracture during use, unless perhaps it is due to the fact that cast iron tends to dampen vibrations while resisting deformation. Conversely, all steels tend to transmit vibrations more pronouncedly and have a lower resistance to deformation than cast iron, which characteristics may cause rupture in the brittle material.

Although the principles of the invention have been described in detail to illustrate several embodiments of the invention, it is obvious that certain materials may be substituted for others without departing from the principles of the invention. Furthermore, although a turning tool is shown having a shank for supporting the tip, it is to be understood that any form of tip-supporting member is intended to be included within the meaning of the term "shank."

What is claimed is:

1. A tool having a cutting tip portion of a relatively brittle material; a shank portion made from cast iron, said cast iron being alloyed with a strength-imparting element; and a strain-resistant layer of bonding material between said shank and tip, said bonding material being different from either of the materials of said tip and shank, whereby tendencies toward tip fracture during normal use are substantially eliminated.

2. A tool having a tip portion of a material having a hardness in excess of 60 Rockwell C and/or possessing the characteristic of red hardness; a shank portion made from a cast iron containing about .40%-.70% chromium; and a strain-resistant layer of bonding material between said tip and shank throughout the entire area of tip support on said shank portion, whereby tendencies toward tip fracture during normal use are substantially eliminated.

3. A tool having a tip portion of a material having a hardness in excess of 60 Rockwell C and/or possessing the characteristic of red hardness; a shank portion made from a cast iron containing about .20%-.30% nickel; and a strain-resistant layer of bonding material between said tip and shank throughout the entire area of tip support on said shank portion, whereby tendencies toward tip fracture during normal use are substantially eliminated.

4. A tool having a tip portion of a material having a hardness in excess of 60 Rockwell C and/or possessing the characteristic of red hardness; a shank portion made from a cast iron containing about .60%-.80% molybdenum; and a strain-resistant layer of bonding material between said tip and shank throughout the entire area of tip support on said shank portion, whereby tendencies toward tip fracture during normal use are substantially eliminated.

5. A tool having a tip portion of a material having a hardness in excess of 60 Rockwell C and/or possessing the characteristic of red hardness; a shank portion made from a cast iron containing about .40%-.70% chromium, about .20%-.30% nickel, and about .60%-.80% molybdenum; and a strain-resistant layer of bonding material between said tip and shank throughout the entire area of tip support on said shank portion, whereby tendencies toward tip breakage are substantially eliminated.

6. A tool having a cemented carbide tip portion; a shank made from nickel cast iron; and a strain-resistant layer of bonding material between said tip and shank throughout the entire area of tip support on said shank portion, whereby tendencies toward tip fracture during normal use are substantially eliminated.

7. A tool having a tip portion of a non-ferrous alloy of chromium and cobalt with small percentages of molybdenum and/or tungsten; a shank made from nickel cast iron; and a strain-resistant layer of bonding material between said tip and shank throughout the entire area of tip support on said shank portion, whereby tendencies toward tip fracture during normal use are substantially eliminated.

FRANKLIN HOWARD LOBDELL.

REFERENCES CITED

The following references are of record in the file of this patent:

UNITED STATES PATENTS

| Number | Name | Date |
| --- | --- | --- |
| 1,887,373 | Emmons et al. | Nov. 8, 1932 |
| 2,019,934 | Schroter et al. | Nov. 5, 1935 |

OTHER REFERENCES

The Making, Shaping and Treating of Steel, fifth edition by C. B. Francis, published by Carnegie-Illinois Steel Corp., Pittsburgh, Pa. (Copy in Div. 13, pages 237 and 239.)